Feb. 6, 1934.    R. C. ANGELL    1,945,510
METHOD OF AND MECHANISM FOR FORMING HARDENED STEEL
Filed Oct. 5, 1931    11 Sheets-Sheet 1
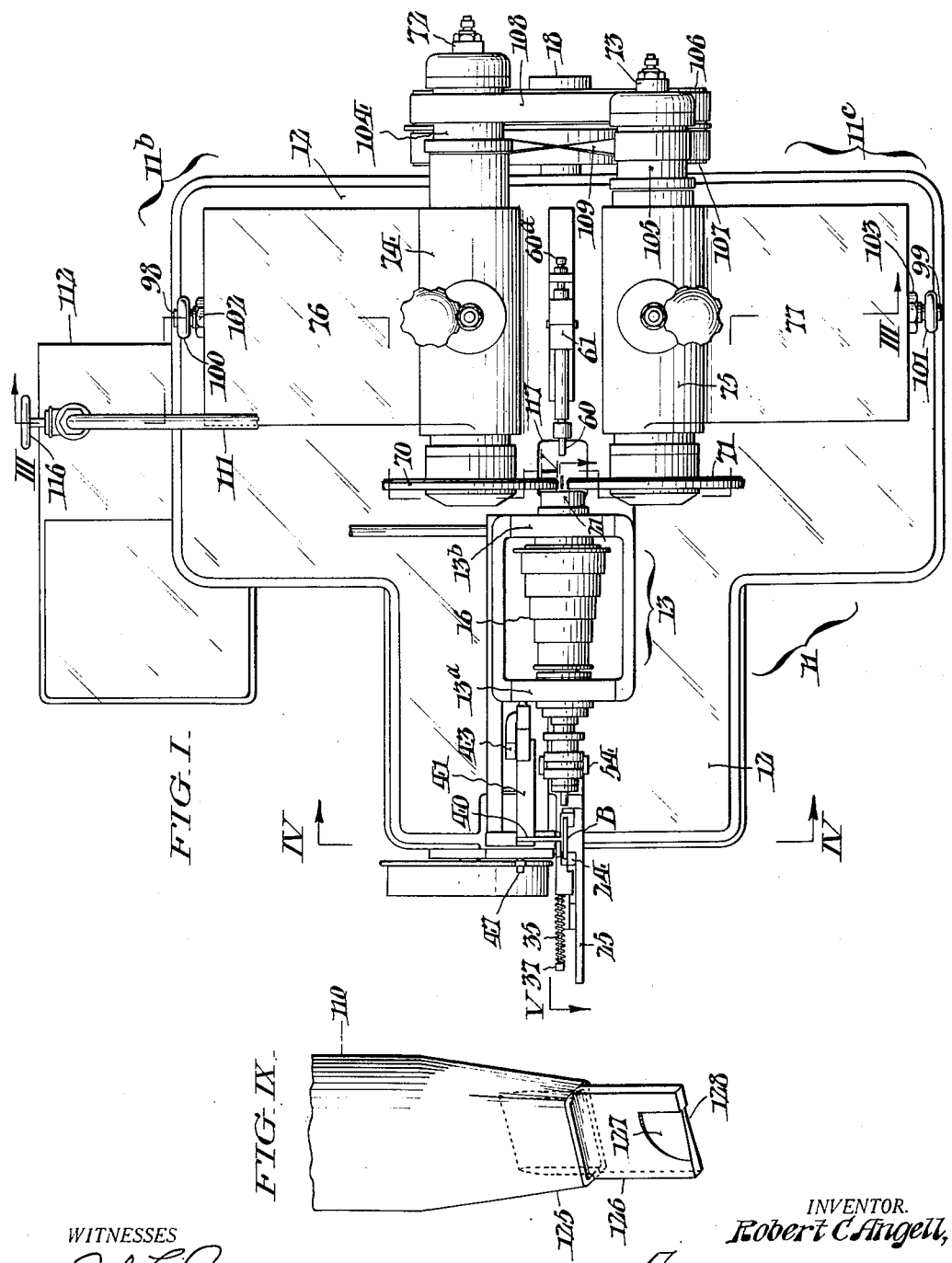
FIG. I.
FIG. IX.
WITNESSES
INVENTOR.
Robert C. Angell,
BY
ATTORNEYS.

Feb. 6, 1934.   R. C. ANGELL   1,945,510
METHOD OF AND MECHANISM FOR FORMING HARDENED STEEL
Filed Oct. 5, 1931   11 Sheets-Sheet 2
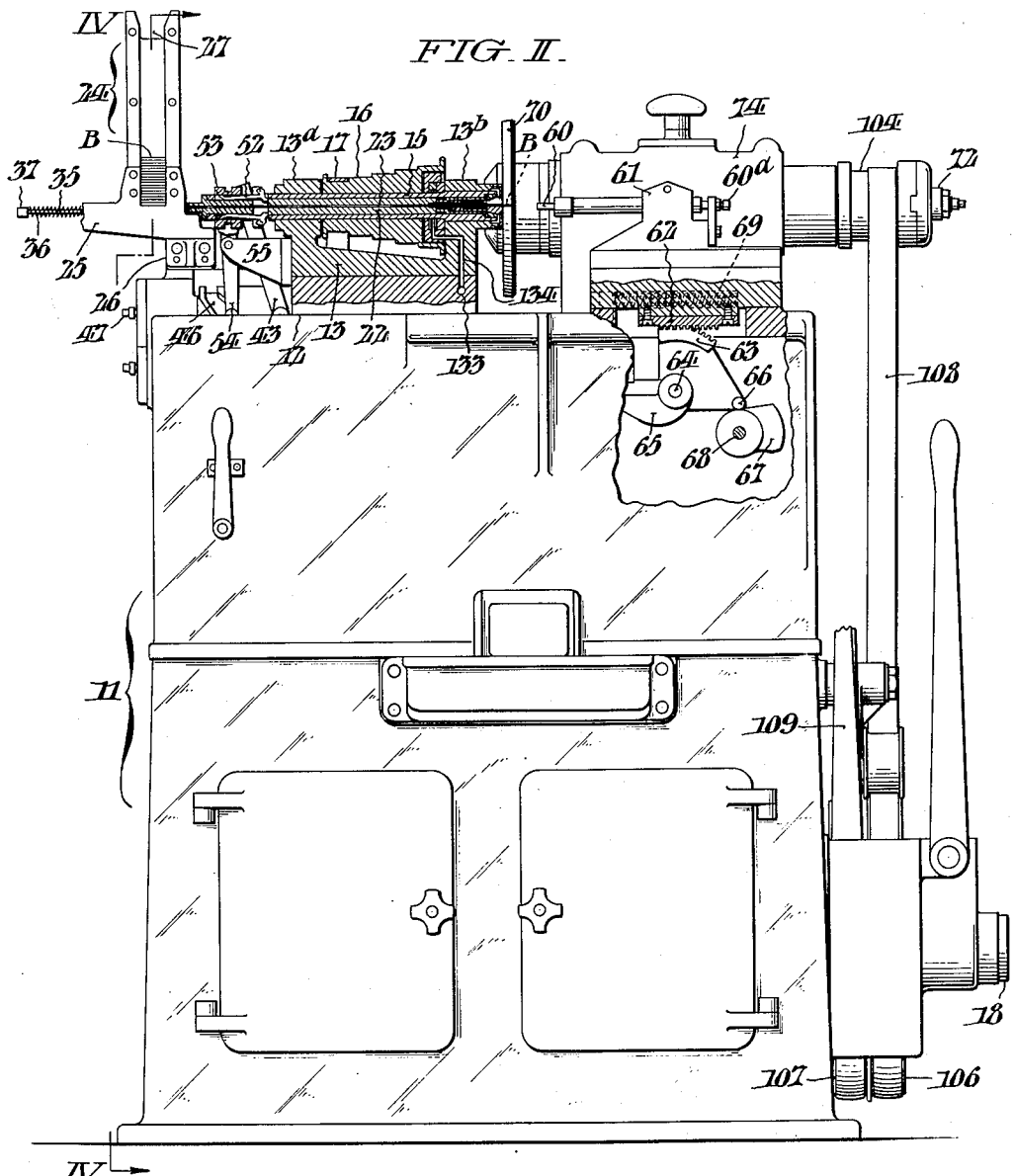
FIG. II.
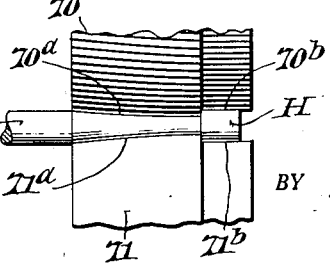
FIG. X.
WITNESSES
John C. Bergner
Thomas W. Kerr, Jr.
INVENTOR.
Robert C. Angell,
BY Fraley Paul
ATTORNEYS.

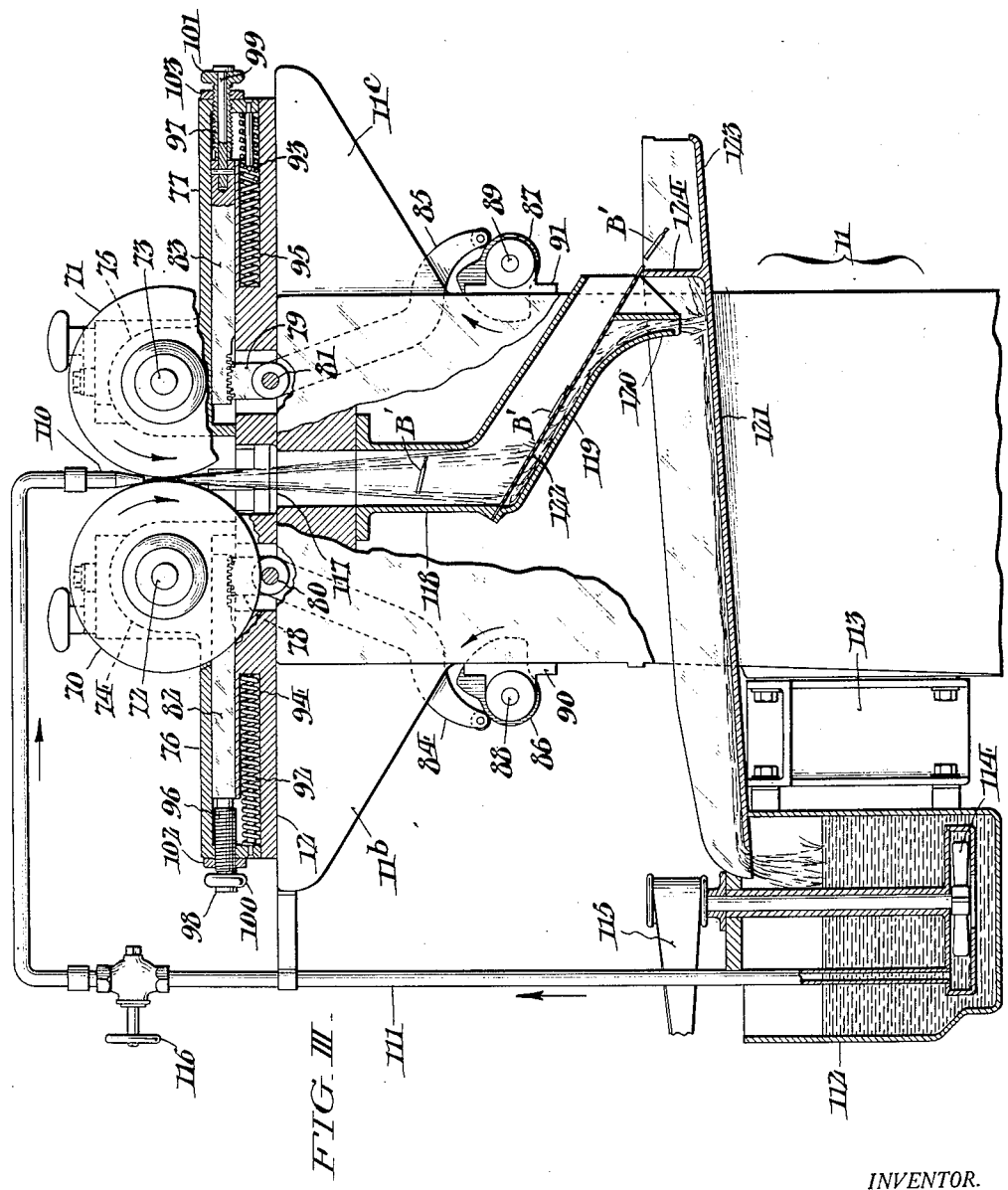

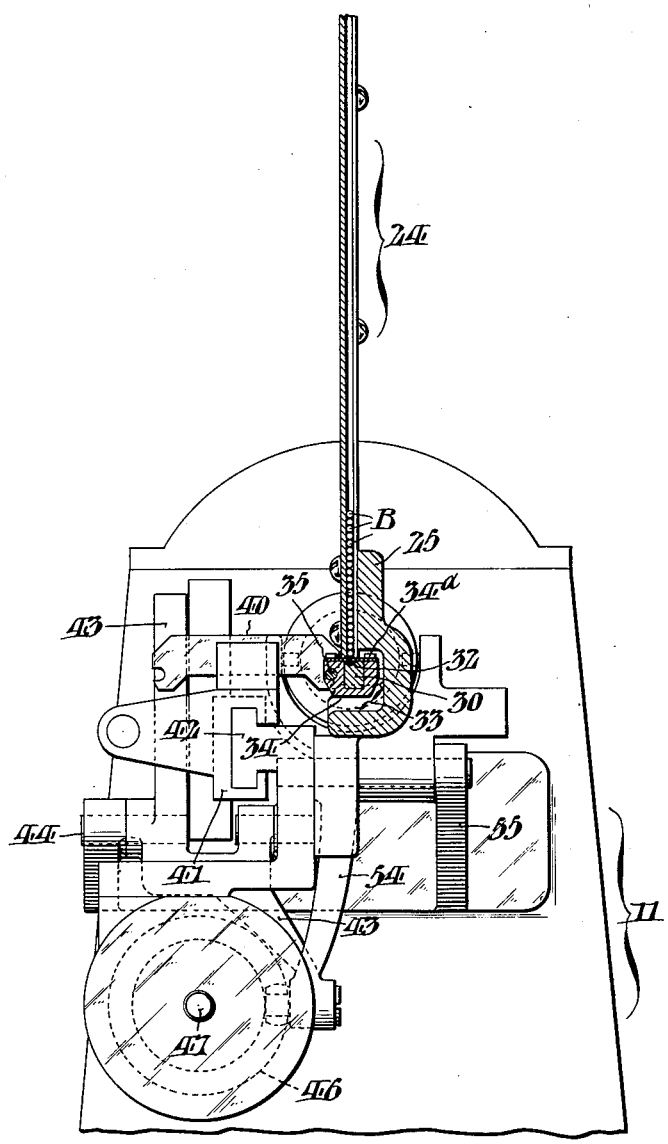

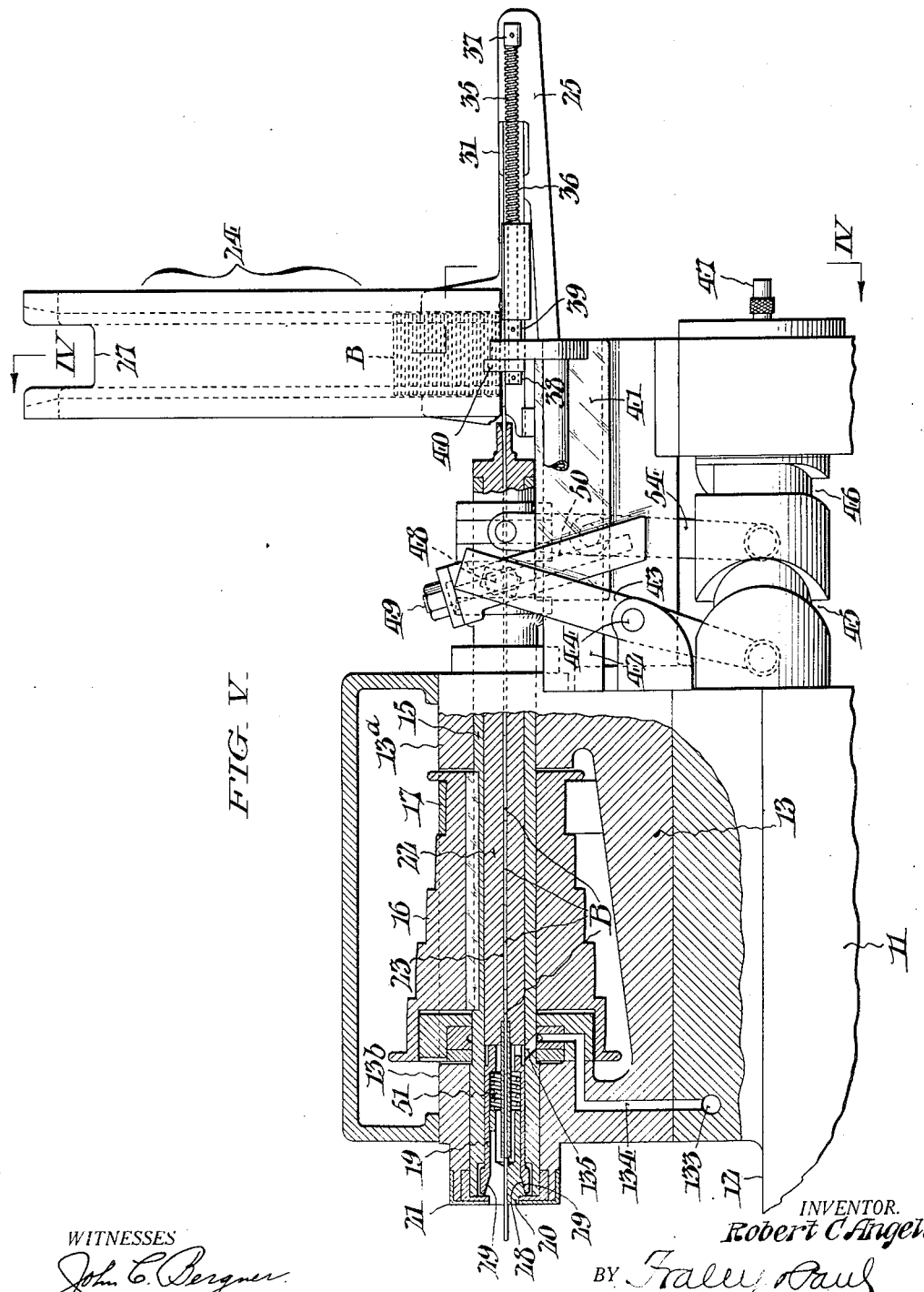

Feb. 6, 1934.   R. C. ANGELL   1,945,510
METHOD OF AND MECHANISM FOR FORMING HARDENED STEEL
Filed Oct. 5, 1931   11 Sheets-Sheet 6
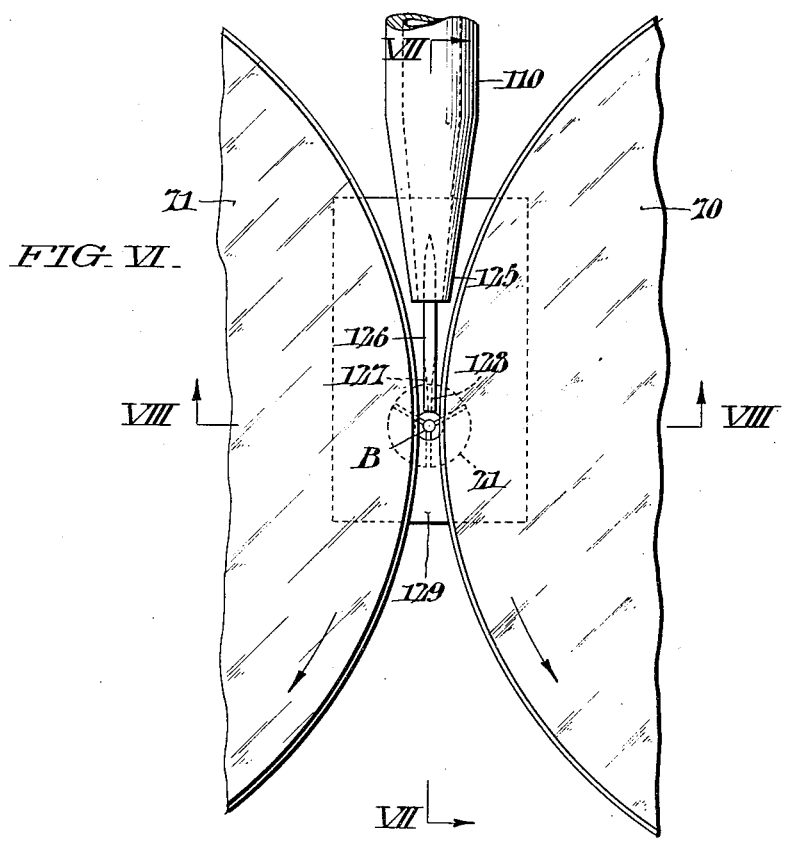
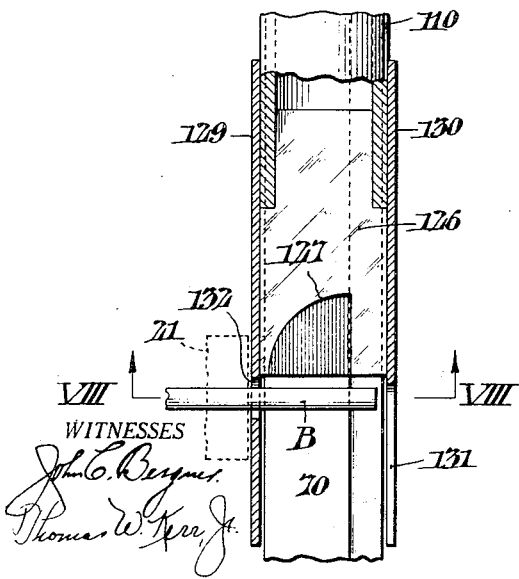
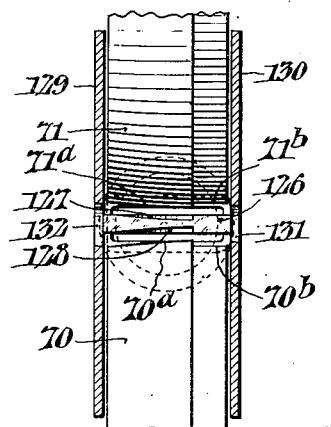

Feb. 6, 1934.     R. C. ANGELL     1,945,510
METHOD OF AND MECHANISM FOR FORMING HARDENED STEEL
Filed Oct. 5, 1931     11 Sheets-Sheet 7
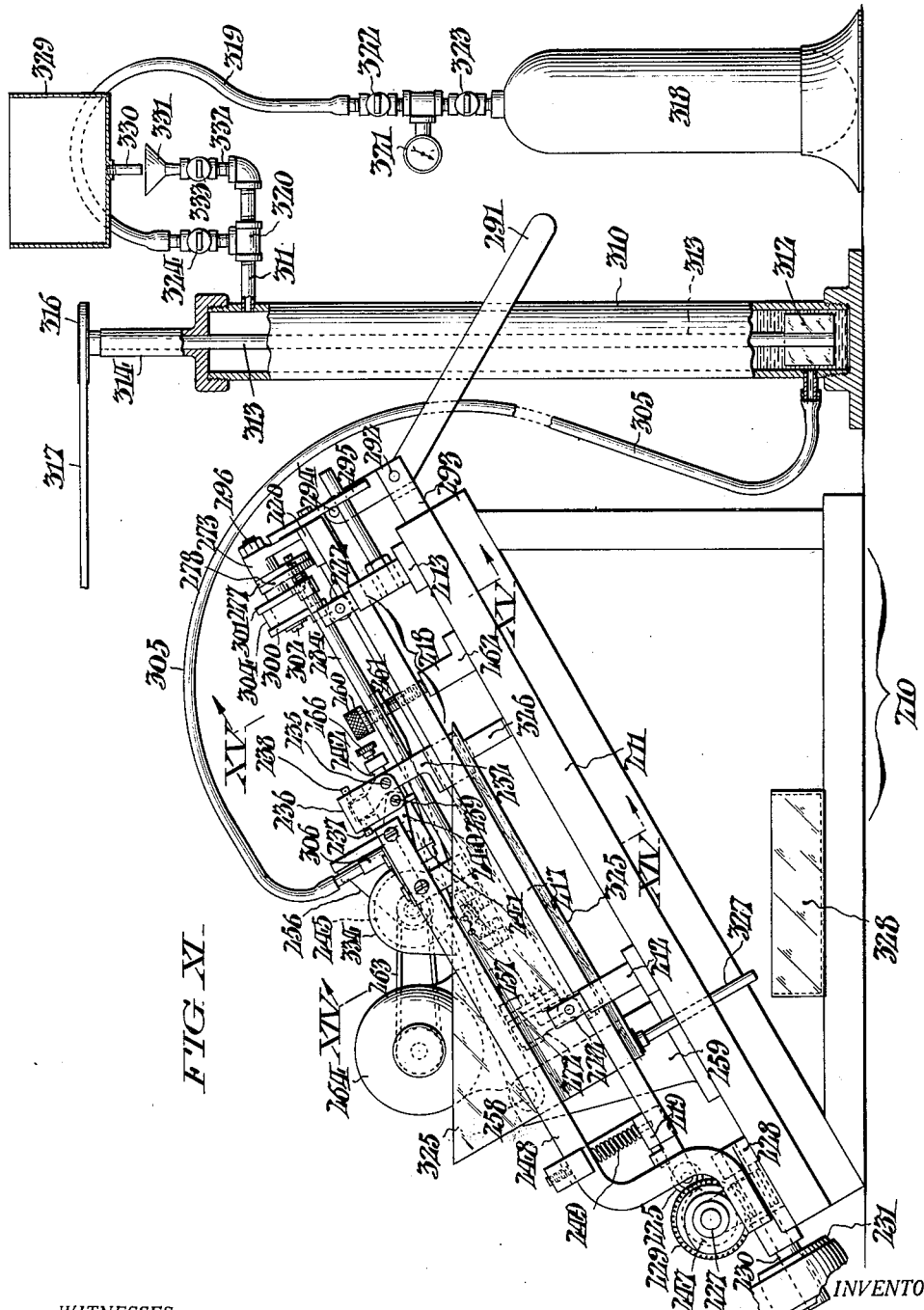
INVENTOR.
Robert C. Angell,
BY Fraley Paul
ATTORNEYS.
WITNESSES
John C. Bergner
Thomas W. Kerr, Jr.

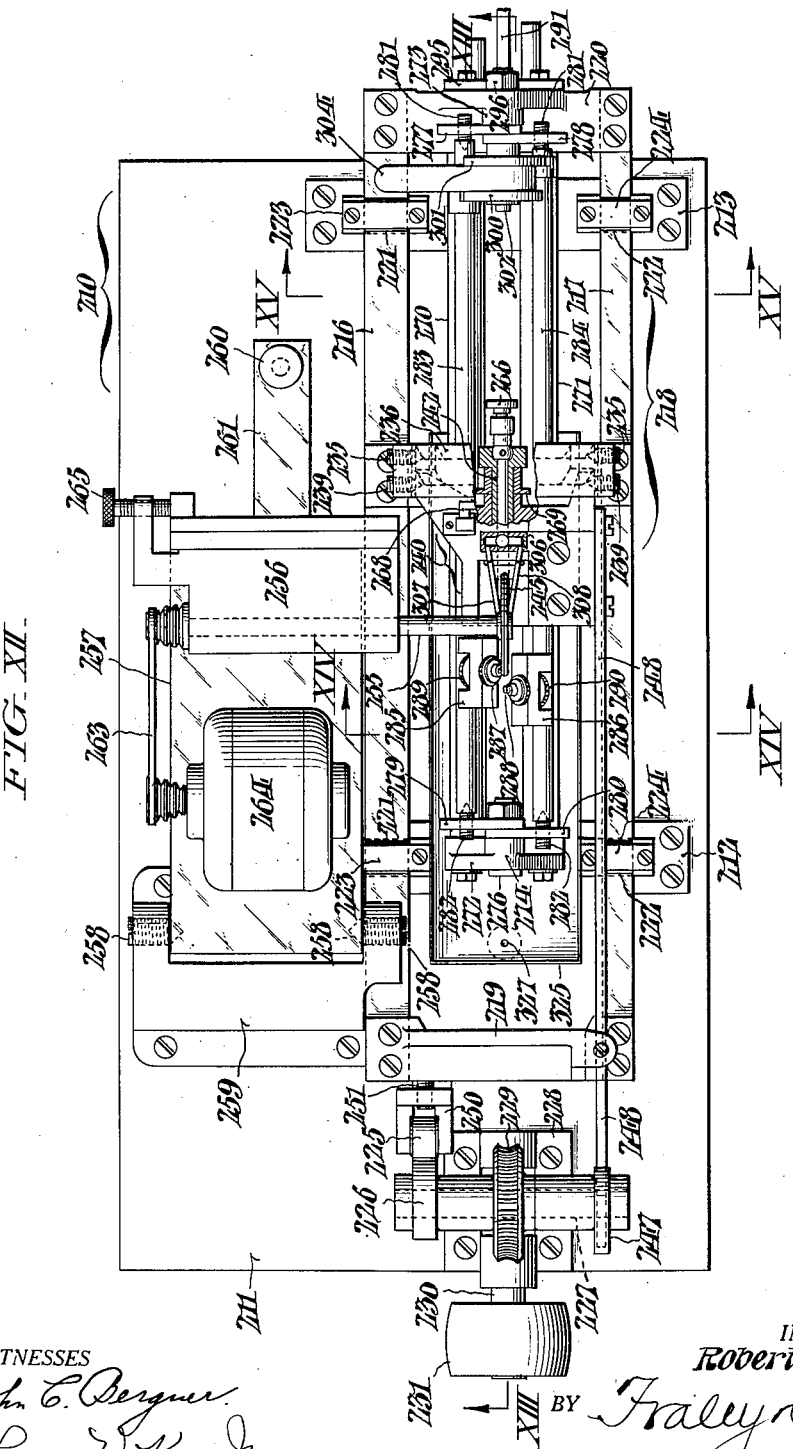

Feb. 6, 1934.   R. C. ANGELL   1,945,510
METHOD OF AND MECHANISM FOR FORMING HARDENED STEEL
Filed Oct. 5, 1931   11 Sheets-Sheet 9
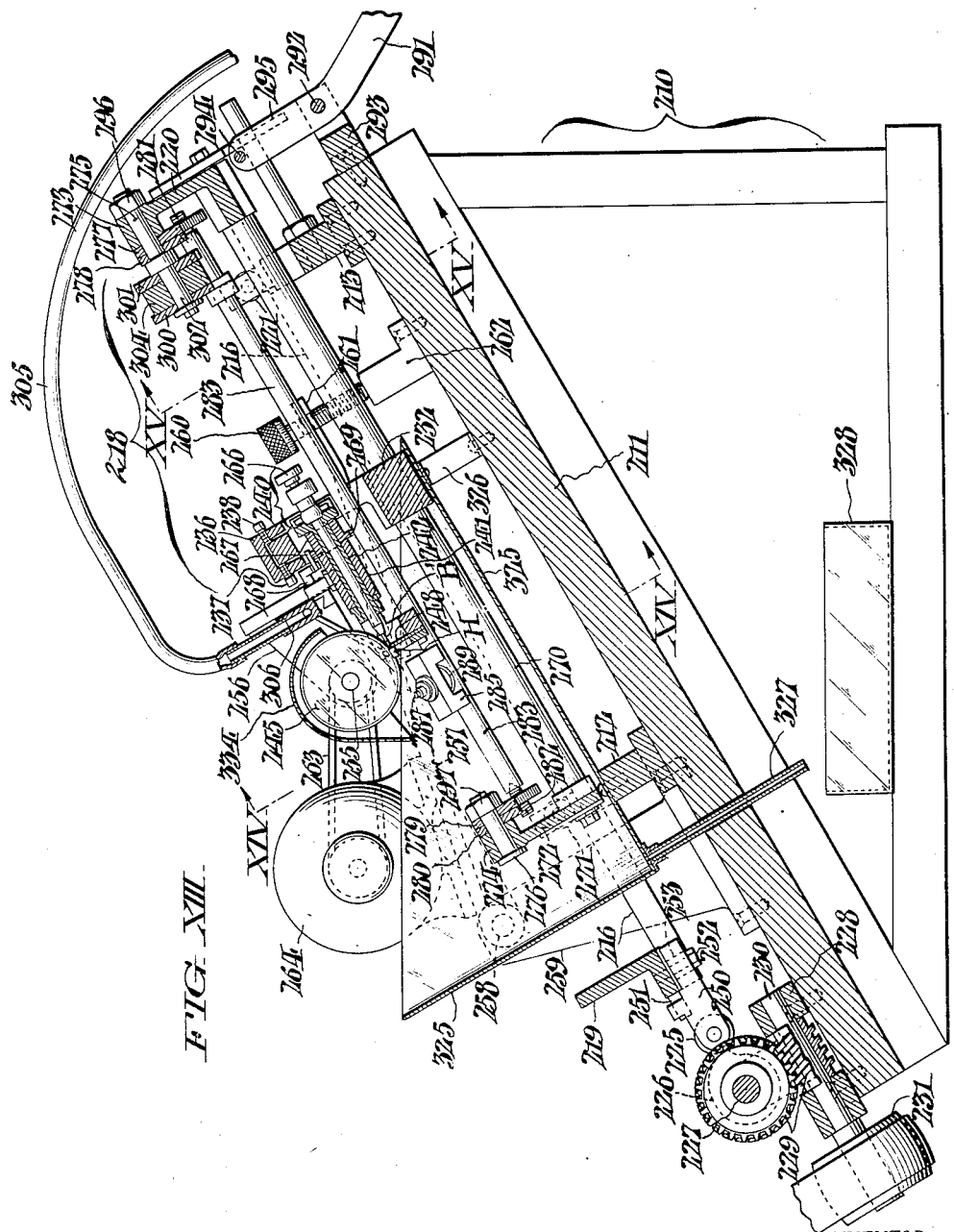
WITNESSES
INVENTOR.
Robert C. Angell,
BY
ATTORNEYS.

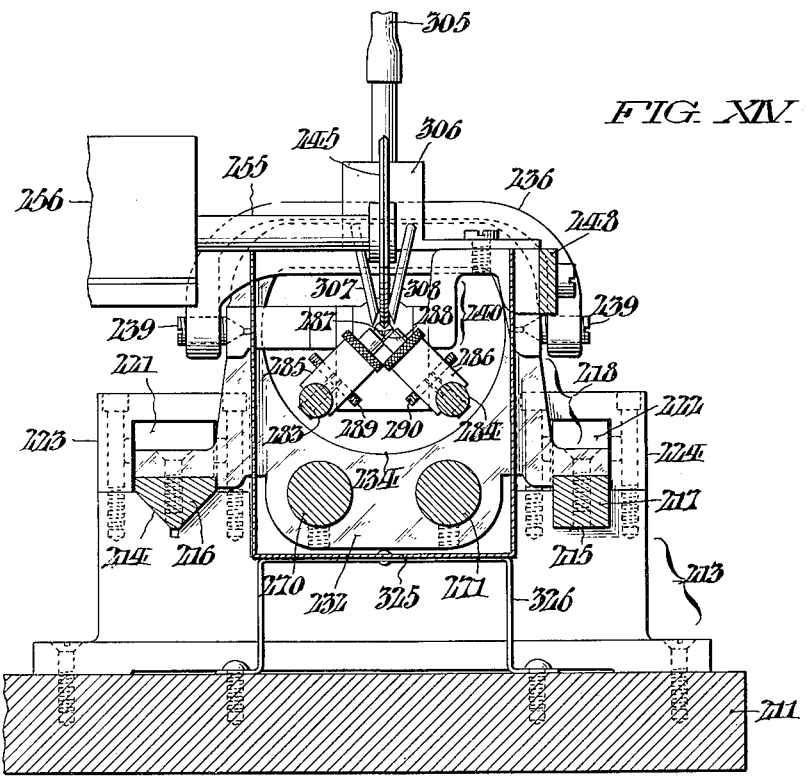
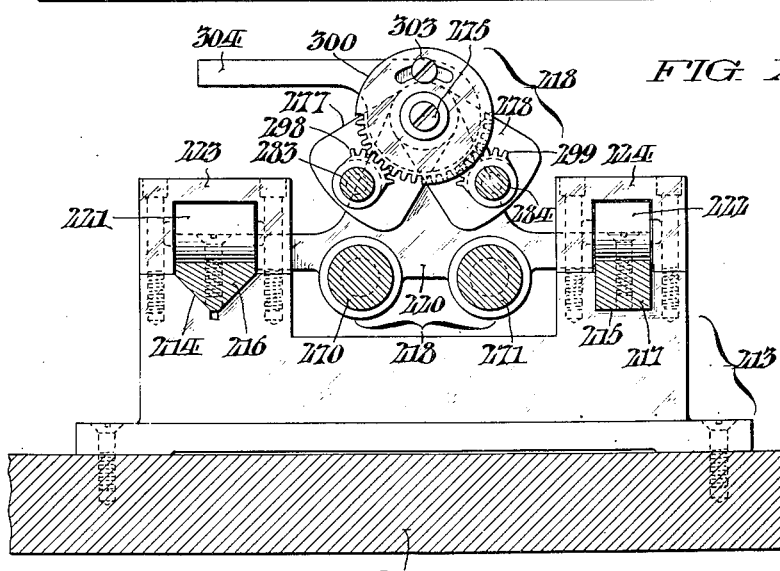

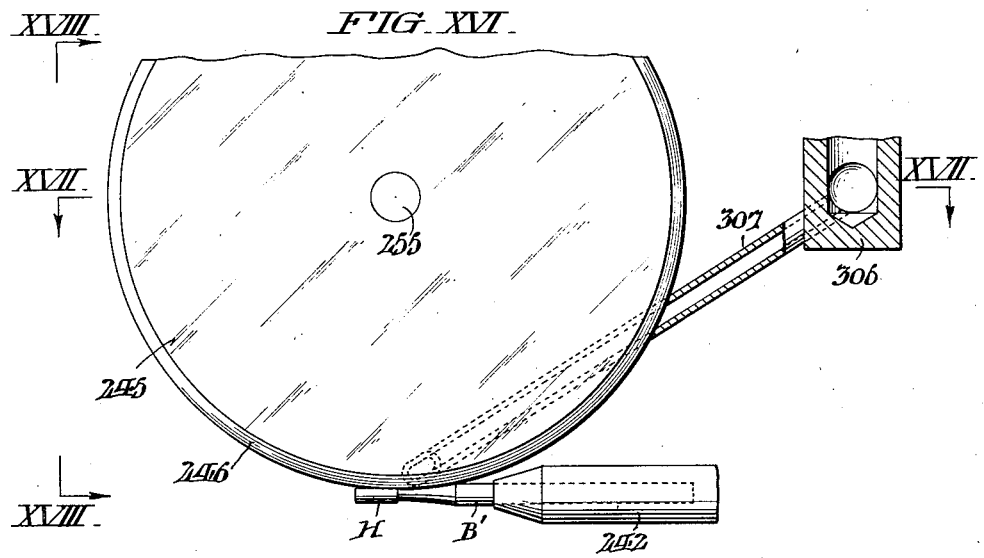
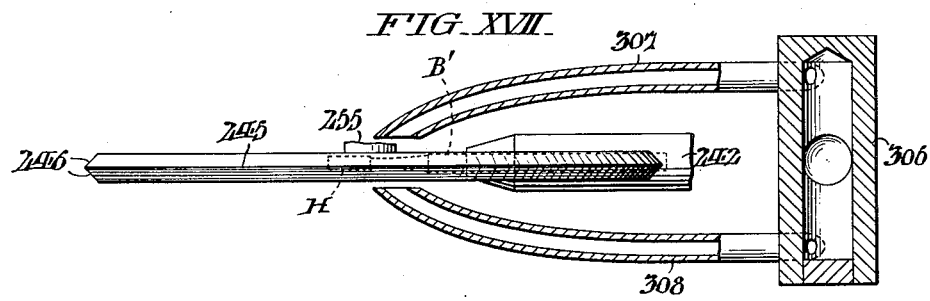
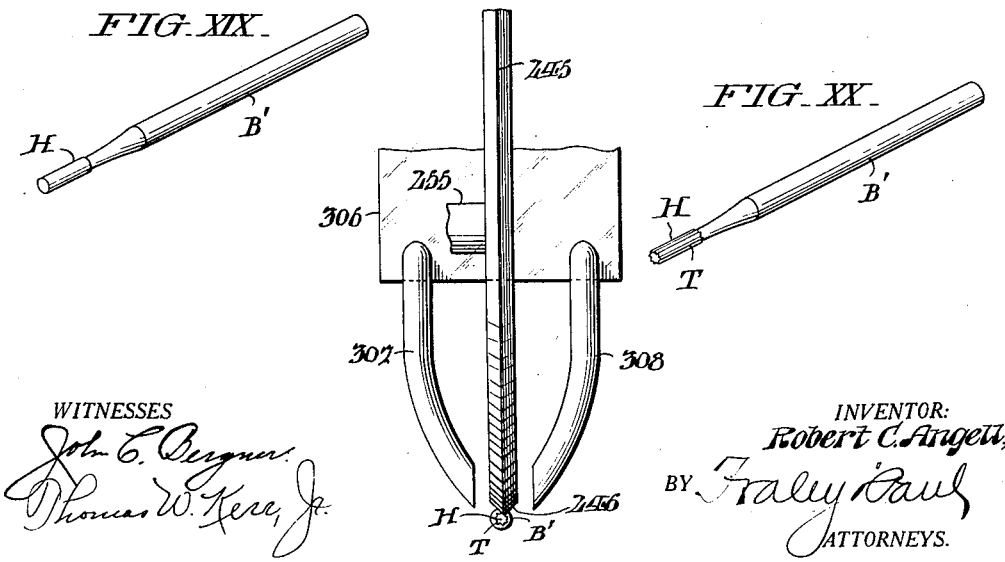

Patented Feb. 6, 1934

1,945,510

UNITED STATES PATENT OFFICE 1,945,510

METHOD OF AND MECHANISM FOR FORMING HARDENED STEEL

Robert C. Angell, Prince Bay, N. Y., assignor to The S. S. White Dental Manufacturing Company, a corporation of Pennsylvania Application October 5, 1931. Serial No. 567,059

6 Claims. (Cl. 51—278)

In the forming of edges on hardened steel difficulty has always been experienced by reason of the tendency of the operation if performed with sufficient rapidity to draw the temper of the steel. Resort has therefore frequently been had to the preliminary formation of the edge upon the steel before hardening, followed by a hardening operation and a subsequent perfecting of the edge after hardening. According to my invention I have succeeded in accomplishing the entire formation of the edge on steel which has been hardened in one operation, and this I have further accomplished with great rapidity and without the generation of such temperature as will injure the temper of the steel, and further, the formation requires such small forces that delicate articles may be shaped to the desired form without distortion due to their flexibility during the shaping operation. By way of example my invention finds utility in the manufacture from hardened steel blanks of burrs such as are used in the dental art, and I will illustrate my invention by reference to this manufacture, although its application is far wider.

Such a burr has a properly shaped head of hardened steel which must be furnished with a succession of sharp cutting edges, and the difficulties to which I have referred have been acutely experienced in the manufacture of these articles until my present invention has succeeded in overcoming them. Previous to my invention these articles were customarily produced and shaped in steel which had not been hardened, and after the cutting of the teeth the steel was hardened and then subjected to a finishing operation to perfect the desired cutting edge. This procedure is troublesome and expensive. By my operation this trouble and expense is avoided since the entire production of the head and of its sharpened edge is accomplished after the hardening of the steel and without injuriously affecting the quality and temper of the steel.

While I have spoken of my invention as applicable to operations for the production of hardened steel edges yet it is obvious that the same may be used for the accurate formation of any other desired shape in hardened steel.

The production of cutting edges or similar shapes in hardened steel has usually been accomplished by a grinding operation, that is to say, an operation in which the roughened surface of a grinding wheel accomplishes the shaping of the metal. The grinding is accomplished by abrasive particles permanently incorporated within or temporarily embedded within (as in lapping) the grinding surface. It is characteristic of my invention that the steel surface is operated upon not by abrasive particles incorporated within the wheel but by abrasive particles carried by a fluid, such as an oil of proper consistency, which is injected between the rotating surface of a very hard wheel and the steel surface to be acted upon. This I have accomplished by the use of a wheel of much greater hardness than (so far as I can ascertain) has ever been used in similar operations. So hard is the surface of this wheel that it does not receive or hold the abrasive particles which flow over its surface. It merely temporarily propels them.

My invention involves a new process or method or procedure in the forming of hardened steel and I will first describe this new process and subsequently describe mechanism which is well adapted for the practice of my process. Grinding wheels are made by embedding very finely divided particles of abrasive in a bond or matrix. The abrasive particles may be emery or carborundum or alundum or similar particles. The matrix or bond is necessarily less hard than the abrasive but must be capable of effecting firm incorporation of the abrasive. If the matrix is too hard the grinding operation will not be properly performed because successful grinding is dependent upon continuous disintegration of the grinding surface whereby new abrasive particles are brought into action and the necessary irregularity of the grinding surface thus perpetuated. If the bond be too hard the projecting abrasive surfaces are worn down and the grinding surface becomes glazed. It therefore ceases to disintegrate and loses its grinding power. Therefore the matrix must always be tenacious enough to firmly incorporate the abrasive yet, on the other hand, sufficiently soft to be gradually worn away, thus increasing the projecting of each of the abrasive particles to the point where the particle is released with formation of a new roughened surface on the wheel.

According to my present process I employ a wheel having a matrix or vitrified bond which is the hardest commercially available. Some manufacturers of wheels designate this as Grade Z, while others designate this as Grade A. This is so hard that if employed in the ordinary grinding operation the surface would soon become smooth and have no grinding power. This hard vitrified matrix I am enabled to employ because in my process the abrasive incorporated upon the surface of the wheel is not itself the chief formative factor, and therefore is not made smooth.

Upon a wheel of this character rotating with great rapidity (between 5000 to 6000 feet per minute) and in close proximity to the hardened steel surface to be formed I inject a stream of rather viscous oil such, for example, as sperm-oil, carrying with it a high proportion of a suitable abrasive such as fine emery. The proportion of oil to abrasive may be about one pint of oil to a pound of emery. This mixture is freely supplied by injection. As the grinding surface approaches the hardened steel surface to be formed the projections or roughenings of the grinding surface occasion a propulsion and some temporary adhesion of the floating abrasive acting somewhat according to the analogy of the vanes of a centrifugal pump. It is therefore the floating abrasive and not the abrasive incorporated within the wheel which accomplishes the major formative action upon the steel. From this distinction important advantages flow for even though the rotating wheel be forcibly advanced with rapidity toward the surface to be formed it is not unduly involved in the operation since the major work of removing particles of steel falls upon the floating abrasive. Furthermore each abrasive particle when it has accomplished its work upon the steel surface (with attendant generation of some heat) is immediately removed from the operation so that there is no cumulative heating effect such as is experienced in the grinding of hardened steel due to the heating up of the grinding edges as they repeatedly come into operative position. My process is the more efficient as the size of the floating abrasive particles is reduced within practical limits, for the increase in the number of the abrasive particles distributes the work and the resultant heating up of the particles and lessens the tendency to any objectionable heating of the metal surface acted upon. These fine abrasive particles float in the oil with production of an emulsion in which form the supply and distribution of abrasive is capable of accurate and complete control.

I have also found that it is desirable that the floating abrasive while necessarily harder than the steel surface which is to be formed, should not be harder than but preferably softer than the abrasive particles incorporated in or embedded within the wheel. This lengthens the life of the wheel because as between the abrasive incorporated in the wheel and the floating abrasive if the former is harder it is the latter which breaks or yields if breaking forces are created between the two.

A valuable field for the employment of my invention is as I have stated the formation of dental burrs. In this art a steel rod is cut into suitable blanks and upon each blank after hardening a suitably shaped head is formed and thereafter suitable teeth are cut in the head. I will describe two pieces of mechanism adapted to successively form the head and then to cut the teeth therein in both of which operations I utilize my process.

Referring to the drawings, Fig. I shows a plan view of a machine embodying my invention for forming the head of the burr.

Fig. II is a side elevation of the machine with portions thereof broken out and sectioned to illustrate important parts which would otherwise be hidden.

Fig. III is a staggered sectional view of the machine taken as indicated by the arrows III—III in Fig. I.

Fig. IV is a fragmentary view of the left hand end of the machine, drawn to a larger scale and having portions in section in the plane of the arrows IV—IV in Figs. I, II and V.

Fig. V is a fragmentary longitudinal sectional view also drawn to a larger scale, and taken as indicated by the arrows V—V in Fig. I, showing the means whereby the blanks are fed and the means whereby the said blanks are held and rotated incident to shaping.

Fig. VI is a fragmentary detail view showing the means for discharging the abrasive fluid at high velocity onto a blank in position between the backing wheels of the machine.

Figs. VII and VIII are fragmentary sectional views taken as indicated respectively by the arrows VII—VII and VIII—VIII in Fig. VI.

Fig. IX shows a perspective view of the abrasive fluid discharging nozzle; and

Fig. X is a fragmentary detail view showing how the blank is profiled by the backing disks of the machine.

Another machine embodying my invention for cutting the teeth on the head of the burr is illustrated in Figs. XI to XX of the drawings, whereof Fig. XI shows a side elevation of this tooth cutting machine.

Fig. XII is a plan view of tooth-cutting machine drawn to a somewhat larger scale.

Fig. XIII is a longitudinal sectional view taken as indicated by the arrows XIII—XIII in Fig. XII.

Figs. XIV and XV are cross sectional views of the tooth-cutting machine taken as indicated respectively by the arrows XIV—XIV and XV—XV in Figs. XI, XII and XIII.

Fig. XVI is a diagrammatic illustration partly in side elevation and partly in section, drawn to a still larger scale than the preceding illustrations, and showing how the abrasive fluid is fed incident to cutting of a burr with the aid of the backing wheel of the machine.

Fig. VII is a detail plan view looking as indicated by the arrows XVII—XVII in Fig. XVI with certain portions broken away and in section.

Fig. XVIII is an elevation of the parts shown in Fig. XVI, viewed as indicated by the arrows XVIII—XVIII in that figure.

Fig. XIX shows a dental burr as it comes from the machine of Figs. I-X; and

Fig. XX is a perspective view of the finished dental burr with the cut teeth.

The machine shown in these illustrations, comprises a hollow pedestal-like base 11 having a T-shaped top or platen 12, on which is mounted a hollow rectangular frame 13, that affords bearings 13a and 13b for a tubular horizontal work holding spindle 15, see Fig. V. Keyed to the spindle 15 is a cone pulley 16 which is adapted to be driven at selectable speeds, by a belt 17 from a similar pulley (not shown) on a drive shaft within the hollow base 11;—the projecting end of the said drive shaft being indicated at 18 in Figs. I and II. The tubular spindle 15 is provided with a chuck sleeve 19, which surrounds a split jaw chuck 20, and which is retained by an inwardly-flanged cap 21 secured over the adjacent end of the spindle.

From Fig. V it will be noted that a chuck rod 22 lodged in the spindle 15 with the chuck sleeve 19 has an axial bore 23 into which the burr blanks B are successively introduced at the right hand end, from a columnar supply magazine 24, the latter being supported by a horizontal arm 25 affixed to a lateral bracket 26 at one end of the machine frame 11. The burr blanks B are stacked one above another, within the magazine 24, which, as shown in Figs. II, IV and V, is open at one side, and has its solid wall cut away at the top as at 27 to afford clearances for the fingers incident to charging the magazine with the blanks. The chuck 20 is radially contracted as a consequence of wedge action between its coned surface 28 and the correspondingly tapered internal surface 29 of the chuck sleeve 19.

In line with the spindle 15 and underlying the magazine 24 is a fixed bar 30 which reaches forwardly from a boss 31 of the extension bracket 25, the said bar having a longitudinal groove 32 in its top adapted to successively receive the lowermost blanks of the stack in the magazine 24. Slidably guided on the bar is a carriage 33 comprising an underbody 34 and a screw attached top plate 34a, which latter overlies the said bar. Extending longitudinally through one side of the underbody 34 of the carriage 33 and having projection beyond both ends of the latter is a rod 35; and surrounding the outer end of this rod is a coiled spring 36 which is in compression between the carriage 33 and a collar 37 pinned to the rod. At its inner end, the rod carries a pair of collars 38, 39 between which engages a lateral finger 40 of a head 41 with guidance for horizontal reciprocatory movement on a way 42 forming a part of the bracket 26, see Figs. I and V. The slide head 41 is moved along its guide way 42 by a roller arm 43 which is fulcrumed to swing on a fixed pivot 44 and actuated by a drum cam 45 alongside another drum cam 46 on a shaft 47, the movement so imparted to the head being somewhat in excess of the length of the burr blanks. As shown in Fig. V, the connecting center 48 between the carriage 41 and its actuating roller arm 43 is adjustable by means of a screw bolt 49 lodged in an angularly disposed lateral offset 50 of the said carriage. By this means, the throw of the carriage can obviously be adjusted to properly feed blanks of different lengths. In this connection the function of spring 36 is to permit the carriage to yield when the burr being fed through the chuck 20 reaches the position determined by the stop 60 subsequently described, thereby pressing the end of the burr against stop with a definite pressure prior to closing of the chuck 20.

After shaping of a blank B, the chuck 20 is automatically released through retraction of the sleeve 19 by a coiled spring 51 in compression between the inner end of the said chuck and an internal circumferential shoulder of the said sleeve. Such release of the chuck is effected through axial shifting of the rod 22 by a series of radially-arranged fingers 52 having pivotal support in slots in that end of the spindle which projects beyond the bearing 13a, and adapted to be rocked on their pivots by a collar 53 which is slidable on the projecting portion of the spindle 15. The collar 53 is in turn actuated by a lever 54 which is fulcrumed in a bracket 55 reaching laterally from the bearing member 13, and which is actuated by the rotary drum cam 46 on a shaft 47, see Figs. IV and V.

Concurrently with release of the chuck and with introduction of a new burr blank B from the magazine 24 into the outer end of the spindle 15 through forward movement of the feed carriage 41 in the manner previously explained, a shaped burr B' is ejected from the opposite end of the spindle 15; while the succeeding burr blank B is intercepted by a stop 60 which is aligned with the said spindle and which is at this time moved forward from a normal retracted position through shifting of a slide 61 which supports it, see Figs. I and II. This slide 61 is confined to a horizontal guide-way in the top 12 of the machine base 11, and said slide has secured to it at the bottom, a toothed rack 62 wherewith meshes a segmental gear 63 having pivotal support at 64 on a fixed bracket 65 within the hollow of the machine base 11, see Fig. II. The segmental gear 63 is rocked on its pivot 64 through cooperation of a roller 66 thereon with a rotary cam 67 on a transverse shaft 68, also within the machine base 11, the said shaft being driven in synchronism with the shaft 47 which carries the drum cams 45 and 46. A spring 69 influential upon the slide 61 for the stop 60, serves to maintain the roller 66 on the segmental gear 63 always in yielding contact with the rotary cam 67. At 60a is shown a means whereby the stop 60 may be adjusted longitudinally in its supporting slide 61 to adapt the machine for operation upon burr blanks of different lengths. The function of the stop 60 is to accurately determine the extent of projection of the individual burr blanks B beyond the end of the chuck 20 for presentation between a pair of backing wheels 70 and 71.

The shaft 47 is driven in unison with shaft 68 having suitable connections (not shown) within the base 11 and is actuated by a toothed clutch tripped by a dog attached to a drum on shaft 88. This construction is not shown since it is one well known in the art of automatic screw machines being used in these machines for the feeding cycle.

These backing wheels 70 and 71 are exactly alike, and, in accordance with my invention, are made to disk form. They are composed of particles of abrasive, such as alundum, in a bond or matrix vitrified to an excessively hard consistency—harder than suitable for grinding purposes for reasons already explained. Their peripheries are curved as at 70a, 71a respectively, and shouldered circumferentially as at 70b, 71b, to determine the profile of the cut made laterally into the side of the burr blank B, see Fig. X. The spindles 72 and 73 of the backing wheels 70 and 71 are journalled in separate bearings 74, 75 upstanding from slides 76 and 77 with guidance on the lateral wings 11b, 11c of the machine base 11, for movement toward and away from the axis of the chuck 20. The described movements are simultaneously imparted to the bearing slides 76, 77 of the backing wheels 70, 71 during the shaping of each burr blank B, by means of segmental gears 78, 79, which are secured to separate shafts 80, 81 journalled in the machine base top 12 as shown in Fig. III, and which mesh with rack bars 82 and 83 within bottom hollows of the said bearing slides. The segmental gears 78 and 79 are rocked as a consequence of the actuation of roller arms 84, 85 depending respectively from their shafts 80 and 81, by rotary cams 86 and 87 on a pair of shafts 88, 89 which are rotative in bearings 90, 91 affixed to opposite sides of the machine base 11. Springs 92, 93 lodged in lateral cavities 94, 95 in the machine base top 12 tend to move the slides 76 and 77 outward and thereby maintain the rollers on the arms 84 and 85 in yielding contact with the rotary cams 86 and 87. In order that the limit of inward movement of the backing wheels 70 and 71 may be varied to determine the desired depth of the lateral cut made in the burr blanks B, the slides 76 and 77 are adjustable relative to the gear racks 82 and 83. The means whereby these adjustments are made include threaded sleeves 96, 97 (Fig. III) which engage tapped apertures in the opposite ends of the slides 76 and 77, the said sleeves bearing at their inner ends against the ends of the rack bars 82 and 83 and being axially bored for passage of headed rod extensions 98 and 99 of the said rack bars. At their outer ends the threaded sleeves 96 and 97 are provided with hand wheels 100, 101 for convenience of making the adjustments. Obviously as the sleeves 96, 97 are rotated in one direction or the other, the slides 76 and 77 are shifted correspondingly with relation to the toothed racks 82 and 83, for the purpose aforesaid. After the adjustments are made, the sleeves 96 and 97 are secured against accidental displacement by means of jamb nuts shown at 102, 103. The backing wheels 70 and 71 are driven at a high rate of speed in the direction of the arrows shown in Figs. III and VI as a consequence of the coordination of pulleys 104 and 105 on their spindles 72 and 73 with larger pulleys 106, 107 on the main drive shaft 18 of the machine, by means of belts 108, 109, see Figs. I and II.

The abrasive fluid which is relied upon to effect the actual cutting of the burr blanks is discharged downwardly through a nozzle 110 all located within the tapered or wedge shaped pass between the two backing wheels 70, 71, and onto the sides of the burr blank B which is being cut, see Figs. III, VI, VII, VIII and IX. The abrasive fluid, is preferably a mixture of sperm-oil and finely comminuted emery. It is continuously and freely supplied to the nozzle 110, through a pipe line 111, from a reservoir 112 shown in Fig. III as being bolted to a bracket 113 at one side of the machine base 11. As shown, the pipe 111 connects at its bottom end with a centrifugal pump 114, which is driven by means of a belt 115 from a suitable source of power (not shown) and which draws the liquid abrasive from within the reservoir 112. Interposed in the pipe 111 is a hand valve 116 for controlling the rate of flow of the abrasive fluid from the nozzle 110. The discharge from the nozzle, after impinging upon the backing wheels 70 and 71 is directed, through an opening 117 in the top 12 of the machine base 11 into a vertical conduit 118 with an inclined bottom portion 119 which discharges, in turn, through a terminal spout 120 into a counter-inclined trough 121 whereby the fluid is returned to the reservoir 112, all as shown in Fig. III. Disposed within the inclined portion 119 of the conduit 118 is a perforated plate 122 which permits passage of the abrasive fluid but intercepts the shaped burrs B' as they are ejected from the chuck 20 to fall down through the opening 117 and the conduit 118, and diverts the said shaped burrs into a receiving tray 123 set apart in the trough 121 by a transverse partition 124. Referring again to Figs. VI-IX it will be observed that the tapered end of the nozzle 110 is flattened to rectangular form as at 125 and subdivided by a central partition 126 with resultant formation of two separate elongate outlets. As shown, the partition 126 is extended beyond the end of the nozzle 110 into close proximity to the burr blank B undergoing cutting. It will also be noted that the partition 126 is gouged out at opposite sides of its lower end as at 127, 128 so that the two streams discharged from the nozzles are accurately directed between the peripheries of the backing wheels 70 and 71 and the opposite sides of the burr B at the regions where the metal of the burr is being cut away. Lateral spread of the stream of abrasive at the nozzle 110 is confined between a pair of guard plates 129, 130 which overlap the backing wheels 70 and 71 as well as the nozzle end. As shown, the guard plate 130 is formed with a vertical slit 131 which will permit the shaped blanks to drop freely when ejected by the chuck 20; while the companion guard plate 129 has an opening 132 for the burr blanks, see Figs. VII and VIII.

To prevent entry of the abrasive fluid into the burr-blank-holding end of the spindle 15, another fluid, such as lubricating oil, is forced out from within the said spindle through the chuck 20 under pressure. This protective fluid is introduced from a suitable source of supply (not shown) into a lateral duct 133 in the top 12 of the machine base and from thence flows upward through connecting passages 134 and 135 into the bore of the spindle 15 for ejection finally through the chuck sleeve and the chuck.

By action of the rotary cams 86, 87, the backing wheels 70 and 71 are first rapidly advanced simultaneously into position proximate the rapidly revolving blank B held in the chuck, and from then on, urged inward at a slower rate thereby insuring a gradual and even cut into the blank from opposite sides. As a consequence of such cutting, the blank burr is formed with a head H, see Fig. X.

As illustrated in Figs. XI-XX, the tooth-cutting machine is supported at an inclination to the horizontal, by a substructure 210, which, in the present instance, is constructed from timber, with a solid top 211 whereto the frame parts of the machine are rigidly secured. These frame parts include a pair of transversely-disposed end brackets 212 and 213 which afford laterally-spaced guide-ways 214 and 215 for the longitudinally-extending slide bars 216 and 217 of a work supporting carriage 218. The bars 216 and 217, are connected at opposite ends by cross members 219 and 220 as shown in Figs. XI, XII and XIII. Rollers 221 and 222 with journal support respectively in bridging blocks 223 and 224 bolted to the end brackets 212 and 213 over the guide-ways 214 and 215, bear on the slide rods 216 and 217, and thus serve to hold the carriage 218 against upward displacement. Reciprocatory movement is imparted to the carriage 218 as a consequence of cooperation of a roller 225 at the depressed end thereof, with a rotary cam 226 on one end of a transverse shaft 227 which rotates in a bearing bracket 228 bolted to the top 211 of the substructure 210 at the corresponding end of the machine. The roller 225 is maintained in contact with the cam 226 solely through influence of gravity upon the carriage 218. The shaft 227 receives motion, through the medium of a worm gear couple 229, from a shaft 230 at right angles, whereon is secured a pulley 231 for belt coordination with a suitable source of power, not illustrated.

Extending crosswise between the side bars 216 and 217 of the carriage 218 intermediate the ends of the latter, is a bridging member 232 having an upward central arching portion with a semi-circular opening 234 therethrough. Pivotally connected at 235 to opposite sides of the bridging member 232, with capacity for angular adjustment, is a yoke 236; and at 237 and 238 is shown a pair of opposing set screws for securing the said yoke in adjusted positions. Fulcrumed in turn on the yoke 236 at 239, is a cradle 240; and rotatable in a central horizontal boss 241 of the said cradle is a chuck sleeve 242 which projects forwardly through the opening 234 of the bridging member 232 and is adapted to receive the burr B' on which teeth are to be cut. As the carriage 218 reciprocates horizontally under the influence of the rotary cam 226, the head H of the burr blank B' is presented tangentially to a profiling or backing wheel 245, which latter has the form of a circular disk with a beveled periphery 246 to determine cutting of teeth of the form shown at T in Fig. XX into the head H of the burr. Concurrently with horizontal reciprocation of the carriage 218, the cradle 240 is rocked on its fulcrum connections 239 with the yoke 236, so that the head H of the burr blank is moved radially toward the center of the backing wheel 245 until a cut of the desired depth is made, and thereupon again withdrawn from the said wheel with attendant easement of the cutting. Such rocking movement of the cradle is induced through action of another rotary cam 247 on the shaft 227, upon a forwardly reaching arm 248 secured to the cradle at one side, see Figs. XI and XII, the said arm being maintained in contact with the cam by means of a compression spring 249 shown in Fig. XI. Obviously, the depth of the cut made in the burr head can be varied by angularly adjusting the yoke 236 to which the cradle 240 is pivoted, with the aid of the set screws 237 and 238 aforementioned. During cutting, the end of the burr B' is held against flexing downwardly by a notched rest plate 248 at the forward end of the cradle 240, see Fig. XIII.

As shown in Fig. XIII, the bracket piece 250, carrying the roller 225 is adjustable relative to the cross member 219 of the carriage 218 by means of a set screw 251, and securable in adjusted positions by a clamp bolt 252 which passes through an elongate slot 253 in the said bracket piece and takes into the cross member. The means just described makes it possible to suit the range of the reciprocatory movement of the carriage 218 to the backing wheel 245 in accordance with the length of the head of the burr B' which is being cut in the machine.

Referring to Figs. XI, XII and XIII, the backing wheel 245 is secured to a spindle 255 which is rotatively journalled in a bearing 256 at one end of a supporting plate 257. At its opposite end this supporting plate 257 is pivoted, by means of needle point screws 258, to an upward bracket 259 bolted to the top 211 of the substructure 210. Through the medium of the thumb screw 260 engaged in an extension 261 of the free end of the supporting plate 257 and bearing against a fixed abutment block 262, the said supporting plate may be raised or lowered to accurately position the backing wheel 245 relative to the chuck 242 on the carriage 218. The shaft 255 of the backing wheel 245 is driven at high speed through a belt connection 263 with an electric motor 264 mounted on the supporting plate 257. By means of a thumb screw 265, the bearing 256 can be shifted laterally of the supporting plate 257 to accurately adjust the backing wheel 245 relative to the longitudinal center of the carriage 218.

After each cut, the chuck sleeve 242 is manually turned by manipulation of a finger knob 266 to present a new surface of the burr head H for tooth cutting. The extent of such turning of the chuck sleeve is determined by an indexing means including a pin 267 which is mounted in the end of a spring finger 268 and which is yieldingly held in engagement with a notched wheel 269 secured to the chuck sleeve, see Figs. XII and XIII.

For the purpose of turning the backing wheel 245 from time to time as may be required, I have provided means as follows: Supported in spaced relation by the end and intermediate cross members 220 and 232 of the carriage 218, is a pair of longitudinal rods 270 and 271 which are joined at their forward ends by a tie bracket 272. The parts 220 and 272 are respectively provided with central upstanding bearings 273 and 274 for bolts 275 and 276. Respectively fulcrumed on the bolts 275 and 276 are pairs of segmental plates 277, 278 and 279, 280 carrying needle point screws 281, 282 which engage the ends of a pair of longitudinal shafts 283, 284. Set on the bars 283, 284 are holders 285, 286 respectively for diamond points 287 and 288 which are radially adjustable relative to the axis of the backing wheel 245 by means of thumb nuts 289, 290. When the backing wheel 245 is to be trued, the carriage 218 is moved to the right in Fig. XII independently of the cam 226, by means of a hand lever 291 having fulcrum support at 292 on a pivot bracket 293 secured to the right hand end of the top 211 of the substructure 210. Above its fulcrum 292, the hand lever 291 carries a laterally-projecting pin 294 which engages the back of a depending plate 295 at the corresponding end of the carriage 218. By depressing the hand lever 291 the diamond points 287 and 288 may be moved past the periphery of the backing wheel. The lateral spacing of the diamond points may be varied through angularly adjusting the segments 277, 278 and 279, 280 about the bolts 275, 276; and after adjustment, the said segments are secured against displacement by clamp nuts 296, 297 respectively associated with the said bolts. As shown in Fig. XV, the shafts 283 and 284 carrying the diamond point holders 285 and 286 are fitted with toothed segmental pinions 298 and 299 which respectively mesh with toothed disks 300 and 301 rotatable on a stud projection 302 of the bolt 275 at the right hand end of the carrier 218, see Fig. XIII. It will furthermore be noted from Fig. XV that the toothed disks 300 and 301 are formed with concentric slots for passage of a clamp screw 303 which takes into a handle 304 rockably supported by the stud projection 302 of the bolt 275. This arrangement obviously permits circumferential adjustment of the toothed disks 300, 301 relative to each other. Through manipulation of the handle 304 of the mechanism just described, it will be evident that the diamond point holders 285 and 286 may be simultaneously moved. The wheel truing operation is carried out as follows: the hand lever 291 is depressed until diamond point 287 is at the point of tangency to the periphery of the backing wheel, then the handle 304 is rocked whereby diamond point 287 is moved in an arc across the beveled face on one side of the wheel thereby truing this bevel; by further depressing the hand lever 291, the second diamond point 288 is brought to the proper truing position at the point of tangency to the wheel and, by a second rocking movement of the handle 304, diamond point 288 trues the other beveled face of the wheel.

The abrasive fluid which is relied upon to actually effect the tooth cutting of the burr B' is conducted, under pressure through a flexible hose or tube 305 to a manifold or header 306 (Figs. XVI–XVIII) secured to the cradle 240 on the carriage 218 so as to move forward and backward with the latter. A pair of inwardly curved jet nozzles 307—308 reaching forwardly and downwardly from the manifold or header 306, direct the abrasive fluid in opposing streams against opposite sides of the backing wheel 245 and the burr B' immediately in advance of the region where the abrading takes place, see Figs. XVI–XVIII. As a means for impelling the abrasive fluid under pressure, compressed air is employed in the present instance, the compressed air being conducted into the top of a vertical cylinder 310 (Fig. XI) containing the fluid, through a pipe 311. To prevent precipitation of the abrasive in the carrying fluid, a paddle 312 is provided for constantly agitating it, the said paddle being attached to the lower end of a vertical shaft 313 which passes axially upward in the cylinder 310 and out through a top bearing 314 to afford attachment for a pulley 316 adapted to be driven by a belt 317. The supply source of compressed air may be a reservoir, such as shown at 318 in Fig. XI with a flexible delivery tube 319 connecting with a fitting 320 interposed in the pipe 311 which enters the cylinder 310 near its upper end. At its top outlet, the reservoir 318 is equipped with a pressure gage 321 intermediate a pair of shut-off valves 322 and 323. Another shut-off valve 324 is provided in the air line 319 at the fitting 320. The splash of the abrasive fluid directed against the backing wheel 245 and the burr B' undergoing cutting, as above explained, is caught by a receiver 325 which underlies the forward portion of the carriage. This receiver 325 is supported, in part by the end bracket 212 of the machine, and in part by a supplemental bracket 326 secured to the top 211 of the substructure 210, see Figs. XI and XIII. The collected fluid drains from the forward end of the receiver 325 through a depending tube 327 into a pan 328 resting on the bottom of the substructure 210. When this pan 328 is full the contents is discharged into a receptacle 329 (Fig. XI) whereof the bottom outlet 330 discharges into funnel 331 in a vertical terminal branch 332 of the pipe 311 which enters the top of the supply cylinder 310. As shown, the terminal branch 332 of the pipe 311 has interposed in it a valve 333 which is normally kept closed. However, when the abrasive fluid is to be introduced into the cylinder 310 from the tank 329, the valve 324 in the air line is shut off, and the valve 333 opened. The fluid thrown off under centrifugal action by the backing wheel 245 is intercepted by a guard 334 surrounding the said wheel, and thereby directed into the receiver 325 previously referred to.

In the operation of the mechanisms which I have now described, it would seem that in my process the liquid carrying minute particles of abrasive is first held upon the rotary wheels by surface tension, and then discharged tangentially therefrom by centrifugal force. This tangential discharge from the rotary wheels accomplishes propulsion of the abrasive particles in a relation substantially tangent to the steel surface to be formed and with sufficient velocity to effect abrasion thereof.

The extreme hardness of the rotary wheel is effective to prevent such abrasion of its surface by the liquid abrasive as would alter its contour and render ineffective its formative action upon the steel. In the grinding of the blanks as above described the contour which is to be ground is a surface of revolution in only one direction. In the other it is a special curve or angle dependent upon the desired shape and produced by the corresponding curvature of the surface of the wheel of rotation, and between successive dressings there must be no such breaking down of the surface of the rotary wheel as will interfere with this contour, hence the necessity of the excessively hard wheel grit and the excessively hard matrix in which it is embedded, otherwise in such a rapid abrading action as occurs in my process there would be alteration of the contour formed due to too rapid destruction of the surface of the rotary wheel.

I believe that one of the important results which is obtained by the use of my present improvements:—viz. the rapid removal of material from a body without undue heating of that body is due to the projection of a great number of emulsified or suspended particles of abrasive against the work surface at a high velocity; the forming or cutting action of such particles being proportioned to the square of the velocity with which they are moving at the instant of impact on the said surface. In the form of apparatus herein illustrated as suitable for the practice of my invention this high velocity is imparted to the abrasive material by projecting the emulsified stream of abrasive into a tapered or wedge shaped opening between the surface of the body to be formed, (e. g. the hardened steel burr blank) and the surface, or surfaces, of the backing wheels; with the result that the particles of this stream are thus subjected to progressive acceleration as they approach their points of action, (by reason of the progressive decrease in the cross sectional area of the stream and the effect thereon of the moving backing surface or surfaces) and are projected against the material to be removed at a velocity which is comparable with, or approximates the speed of movement of the backing surface.

I believe it to be novel to accomplish the formation of a hardened steel surface by the employment of an emulsified abrasive as distinguished from one which is either permanently or temporarily adherent to the wheel and I claim this as my invention. I have also spoken of this abrasive as a liquid abrasive by which I mean a liquid carrying a finely divided abrasive in suspension or emulsion and sufficiently viscous to support the abrasive as it is propelled into abrading contact with the surface to be formed.

In describing my invention, I have made statements in regard to the method of operation which are not capable of visual or experimental determination. I believe that these statements embody the true explanation of the result which I have secured, but I wish it to be understood that my claim for the accomplishment of the new and useful result which I have secured is not to be limited by theoretical considerations which subsequent more accurate knowledge may vary.

I have frequently spoken of hardened steel as the material in connection with which my new method and mechanism finds utility but it must be understood that the same method and mechanism is useful in connection with other materials having a like hardness, as for instance stellite and carboloy.

Having thus described my invention, I claim:

1. The process of abrading a hardened steel surface or the like which consists in propelling a stream of liquid abrasive against said surface by feeding the liquid abrasive to a surface harder than both the steel and the abrasive, which surface is rotating in immediate proximity to the surface to be abraded, and is continually carrying the liquid abrasive into contact with the surface to be abraded.

2. The process of abrading a hardened steel surface or the like which consists in propelling a stream of liquid abrasive against said surface by feeding the liquid abrasive to a rapidly rotating hard surface which is in immediate proximity to the steel surface to be abraded, the hard rotary surface consisting of an excessively hard matrix bonding together harder particles of suitable abrasive.

3. The process of abrading a hardened steel surface or the like which consists in propelling a stream of liquid abrasive against said surface by feeding the liquid abrasive to a rapidly rotating hard surface which is in immediate proximity to the steel surface to be abraded, the hard rotary surface consisting of an excessively hard matrix bonding together harder particles of suitable abrasive, the abrasive in the liquid being harder than the steel but not so hard as the abrasive in the wheel.

4. The process of forming hardened steel articles or the like which comprises the suspension of finely divided particles of abrasive in a liquid medium, the projection of a stream of this emulsified material against the surface to be formed at a high velocity, and the direction of the said stream against the said surface by a backing medium which is itself more resistive to abrasive action than the steel.

5. The process of removing material by abrasive action which comprises the formation of an emulsion of abrasive particles in a viscous liquid, the projection of a stream of such emulsion at a high velocity into and through a restricted wedge shaped opening between the said material and an opposing backing surface which is more resistive to abrasive action than the material itself.

6. The process of abrading a hardened steel surface or the like which consists in forcing a stream of liquid abrasive against said surface by feeding the liquid abrasive to a cylindrical surface harder than both the steel and the abrasive, which cylindrical surface has a rapid tangential motion in relation to the surface to be abraded.

ROBERT C. ANGELL.